(12) United States Patent
Green

(10) Patent No.: US 7,008,985 B1
(45) Date of Patent: Mar. 7, 2006

(54) AEROSOL CEMENT AND VALVE FOR DISPENSING

(76) Inventor: Ronald D. Green, 13595 Cable Rd., Pataskala, OH (US) 43062

( * ) Notice: Subject to any disclaimer, the term of this patent is extended or adjusted under 35 U.S.C. 154(b) by 237 days.

(21) Appl. No.: 10/644,531

(22) Filed: Aug. 21, 2003

Related U.S. Application Data

(63) Continuation of application No. 09/905,373, filed on Jul. 16, 2001, now Pat. No. 6,652,704, which is a continuation-in-part of application No. 09/347,787, filed on Jul. 6, 1999, now abandoned, which is a continuation-in-part of application No. 08/920,600, filed on Aug. 28, 1997, now abandoned, and a continuation-in-part of application No. 10/168,121, filed as application No. PCT/US00/26276 on Oct. 26, 2000, now Pat. No. 6,736,288.

(51) Int. Cl.
*C08K 5/15* (2006.01)
(52) U.S. Cl. .................. 524/95; 524/111; 524/113; 156/333; 156/331.6
(58) Field of Classification Search ............ 156/333, 156/331.6; 524/95, 111, 113
See application file for complete search history.

(56) References Cited

U.S. PATENT DOCUMENTS

| | | | | |
|---|---|---|---|---|
| 3,033,473 A | * | 5/1962 | Kitabayashi | 239/579 |
| 3,061,203 A | * | 10/1962 | Kitabayashi | 239/337 |
| 3,074,601 A | * | 1/1963 | Kuffer | 222/402.24 |
| 3,209,960 A | * | 10/1965 | Green | 222/402.24 |
| 4,572,406 A | * | 2/1986 | Pratt et al. | 222/39 |
| 5,027,985 A | * | 7/1991 | Abplanalp | 222/402.1 |
| 6,429,242 B1 | * | 8/2002 | Macher et al. | 524/113 |
| 6,613,186 B1 | * | 9/2003 | Johnson | 156/333 |
| 6,652,704 B1 | * | 11/2003 | Green | 156/308.6 |

* cited by examiner

*Primary Examiner*—Jeff H. Aftergut
(74) *Attorney, Agent, or Firm*—Richard L. Huff

(57) ABSTRACT

An aerosol solvent weld cement composition for joining ends of plastic pipe. The composition contains at least one polymer capable of welding the plastic pipes to each other, at least one solvent for the polymer, and at least one propellant for the polymer/solvent solution. The composition is maintained under pressure greater than atmospheric pressure in an aerosol container. A female omnidirectional valve is disclosed for use in the aerosol container. This valve allows the solvent weld cement composition to be applied to pipes from any angle.

10 Claims, 3 Drawing Sheets

AEROSOL CEMENT AND VALVE FOR DISPENSING

CROSS-REFERENCE TO RELATED APPLICATIONS

This application is a continuation of Ser. No. 09/905,373, filed Jul. 16, 2001, now U.S. Pat. No. 6,652,704, which is a continuation-in-part of Ser. No. 09/347,787, filed Jul. 6, 1999, now abandoned, which is a continuation-in-part of Ser. No. 08/920,600, filed Aug. 28, 1997, now abandoned. This application is also a continuation-in-part of Ser. No. 10/168,121, filed Jun. 17, 2002 now U.S. Pat. No. 6,736,288, which relies on the filing date of PCT application Ser. No. PCT/US00/26276, filed Oct. 26, 2000.

STATEMENT REGARDING FEDERALLY SPONSORED RESEARCH OR DEVELOPMENT (Not applicable)

REFERENCE TO SEQUENTIAL LISTING, A TABLE, OR A COMPUTER PROGRAM LISTING APPENDIX SUBMITTED ON A COMPACT DISS (Not applicable)

BACKGROUND OF THE INVENTION

1. Field of the Invention

This invention is directed to an aerosol solvent weld cement composition, a dispensing system including an omnidirectional female valve for dispensing the composition, and a method of joining pipe using the composition.

2. Description of the Related Art

Plastic pipe has become increasingly used in a wide variety of applications, such as in water transmission networks, residential plumbing, and in the construction of a wide variety of structures having no relation to water transmission. Plastic pipe continues to replace ceramic and metal pipe in a variety of applications owing to its reduced weight, lower cost, and resistance to cracking under stress. Suitable plastics commonly used for pipes are chloropolyvinylchloride, known as CPVC, polyvinylchloride, known as PVC, or poly(acrylonitrile-butadiene-styrene), known as ABS. Of these, the PVC is the most common.

It is known in the art to join sections of plastic piping together in the formation of an elongated plastic pipe. Solvent weld cement has been used as a bonding agent in the joining of sections of plastic pipe. This agent softens the plastic surfaces to which it is applied and, when the surfaces harden, they are chemically bound together.

U.S. Pat. No. 5,336,351, issued to Meyers, discloses the use of solvent weld glue (or cement) to join pieces of plastic pipe. In this disclosure, a male end of a first section of plastic pipe is fitted with a flexible pipe connector made of low density polyethylene to form multiple receiving means on the outer surface. Solvent weld cement is applied to the receiving means and the thus-treated male end is inserted into the female end of a second section of plastic pipe. This method requires additional material, thus adding to the expense of construction. Also, if the work is being performed in confined areas, the attachment of the flexible pipe connector to the male end of the pipe would add frustration and labor costs to the procedure. The Meyers disclosure does not reveal the composition of the solvent weld cement or the method of application of the solvent weld cement to the flexible pipe connector.

King, Sr., in U.S. Pat. No. 4,687,798, reveals the use of a solvent weld cement wherein the improvement is an added ingredient in the solvent. The solvent weld cement is useful for the purpose of joining pieces of PVC. The use of solvent weld cements in the joining of plastic pipes is mentioned in this patent. The compositions of the King, Sr. formulation are stored and used in liquid form. The conventional method of using solvent weld cement compositions is to apply them with a brush or cloth to the pipes to be joined. This involves the use of an open container of the composition at the work site. Whether laying plastic pipes in trenches or in buildings under construction, the conditions for using an open container of liquid are far from ideal in that there is little open room. In such environments, the pipe layer has no convenient location where an open solvent weld cement container can be placed. During the process of installing pipes in trenches, the solvent weld cement container typically is placed either in the trench or alongside the top of the trench. Since the container may be knocked or kicked over, there is risk of a resultant loss of solvent weld cement, contamination of the soil with hazardous substances, and attendant loss of time and productivity. Also, there is the risk of contamination of the solvent weld cement by dirt, debris, or water at the work-site, which can adversely affect the efficiency of the solvent weld cement.

There are additional problems associated with the use of existing liquid solvent weld cements which are applied to the plastic pipes to be joined by use of a brush or cloth, This mode of application is normally messy, especially in cramped areas. Also, this mode of application often does not result in the desired uniformity of coverage. Thus, this method may fail to provide an effective amount of cement in some areas while other areas may contain too much, causing possible failure of the joint, waste, and mess.

Another drawback associated with liquid solvent weld cements is that they typically do not allow the installer enough time to properly align the abutting plastic pipes because the cement sets up in only three to five seconds and produces a weld that cannot be altered. Thus, it is desirable to have a solvent weld cement which can be applied to plastic pipe in such a manner that set-up time is extended to give the installer enough time to properly align the plastic pipe segments and be assured that the joint is proper.

Smrt et al, in U.S. Pat. No. 5,453,219, teaches an aerosol container containing a composition comprising an abrasive grit and a binder solution. The binder solution, which is suitable for affixing the grit onto a surface includes a polymeric resin, a solvent, and a liquid propellant. Upon being sprayed onto a surface, the solvent evaporates and the polymeric resin adheres the abrasive grit to the surface. The patent identifies the valve as being a standard SV-78 valve and the actuator as being a standard actuator.

It has been determined that in the spraying of paint, adhesives, and undercoatings from pressurized aerosol containers, the use of a male valve is inappropriate as male valves demonstrate a tendency to clog or plug, thereby rendering the aerosol container inoperative. The use of female valves for polymers has, until now, been limited to containers which are held upright. Such valves are less than ideal for the task of connecting plastic pipe as this task requires the sprayed composition to approach the pipe from all angles. Until now, an omnidirectional female valve has not been available to the art, and this has required physical gyrations by the user if anything other than surfaces easily sprayed by an upright container needed to be sprayed.

It can thus be seen that there exists a need for an aerosol composition having a solvent, a polymeric solvent weld cement material, and a propellant in a pressurized aerosol container wherein the container can be used in any position, the contents do not clog the valve, and the contents do not erode the container.

SUMMARY OF THE INVENTION

This invention is directed to an aerosol solvent weld cement composition giving superior holding properties, a valve for improving the application of this composition onto plastic pipes, and a method of spraying the composition onto ends of plastic pipe segments during the fitting together of the segments.

The aerosol solvent weld cement composition of this invention consists essentially of (a) at least one polymer capable of welding plastic pipes to each other, (b) at least one organic solvent capable of dissolving the polymer, and (c) at least one propellant capable of dispensing the solvent and the polymer. The solvent weld cement composition of this invention is maintained under higher-than-ambient pressure in a sealed aerosol container. In a preferred embodiment, the aerosol container is equipped with a novel female valve which allows for omnidirectional spraying.

Additional ingredients may be added to the basic aerosol solvent weld cement composition of this invention as long as they do not materially affect the basic and novel character of the composition. These added ingredients include a dye, a suspending agent, and a stabilizer.

The present invention also includes a method of dispensing the aerosol solvent weld cement composition from the aerosol container using the omnidirectional female valve of this invention onto end portions of pipe segments to be joined.

This method comprises (a) obtaining an aerosol solvent weld cement composition consisting essentially of at least one polymer capable of welding plastic pipe ends to each other, at least one organic solvent capable of dissolving the polymer, and at least one propellant capable of dispensing the polymer and organic solvent from a pressurized aerosol container, which container has an outlet and an omnidirectional female valve controlling flow through the outlet; (b) opening the valve of the container to dispense the aerosol composition onto ends of pipe segments to be joined, and (c) aligning and joining abutting pipe ends.

By using the composition and method of the present invention, contamination and waste of the solvent weld cement are avoided and a neat, uniform, application of solvent weld cement is made to the desired pipe surface resulting in a superior bond between the pieces of plastic pipe. Application of the cement according to the method of the present invention provides a longer set-up time than comparable brush application techniques, allowing for a better alignment and fit before the cement sets.

DETAILED DESCRIPTION OF THE INVENTION

Figure 1:
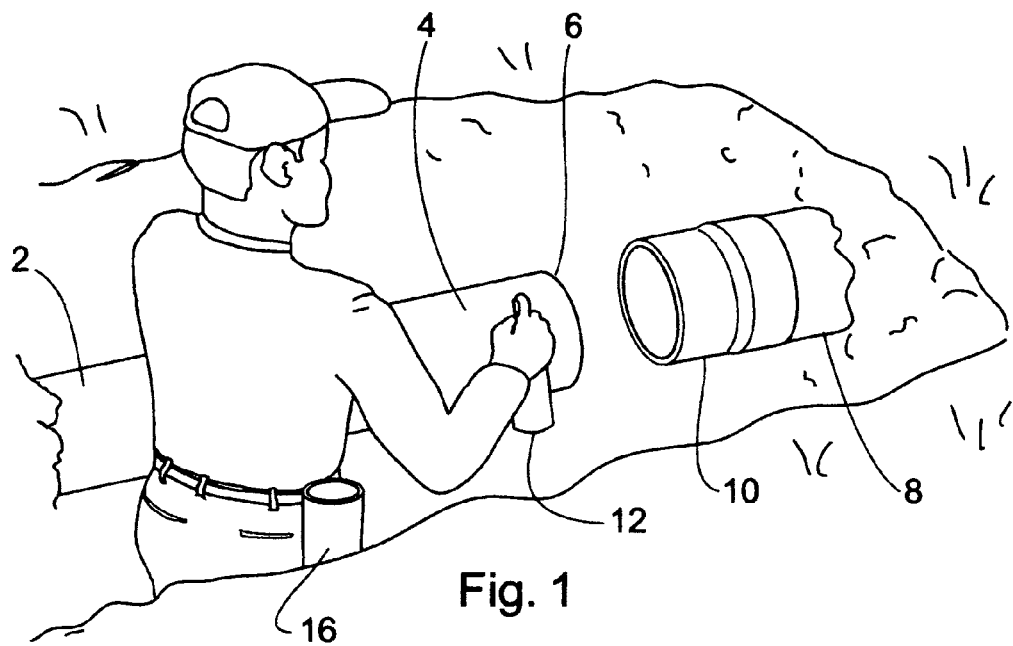
FIG. 1 is a perspective view of a trench wherein an installer is laying water pipe by joining pipe segments according to the method of this invention.
Figure 2:
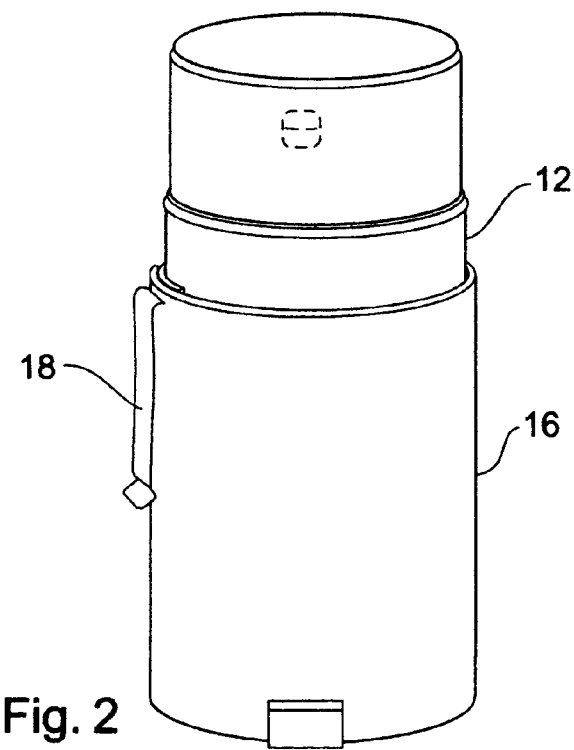
FIG. 2 is a perspective view of an aerosol container in accordance with one embodiment of the present invention.

The preferred embodiments will now be described with reference to the Figures. Like character numerals refer to like features throughout the description.

Plastic water pipe, 2 conventionally made from CPVC, PVC or ABS is typically laid in trenches 7 to 10 feet deep. In connecting the pipe segments, the installer joins a first segment 4 having a bell, or female, end 6 with a second segment 8 having a spigot, or male, end 10. The spigot 10 of the second segment 8 is of a size which will allow it to snugly fit within the bell 6 of the first segment 4.

Figure 3:
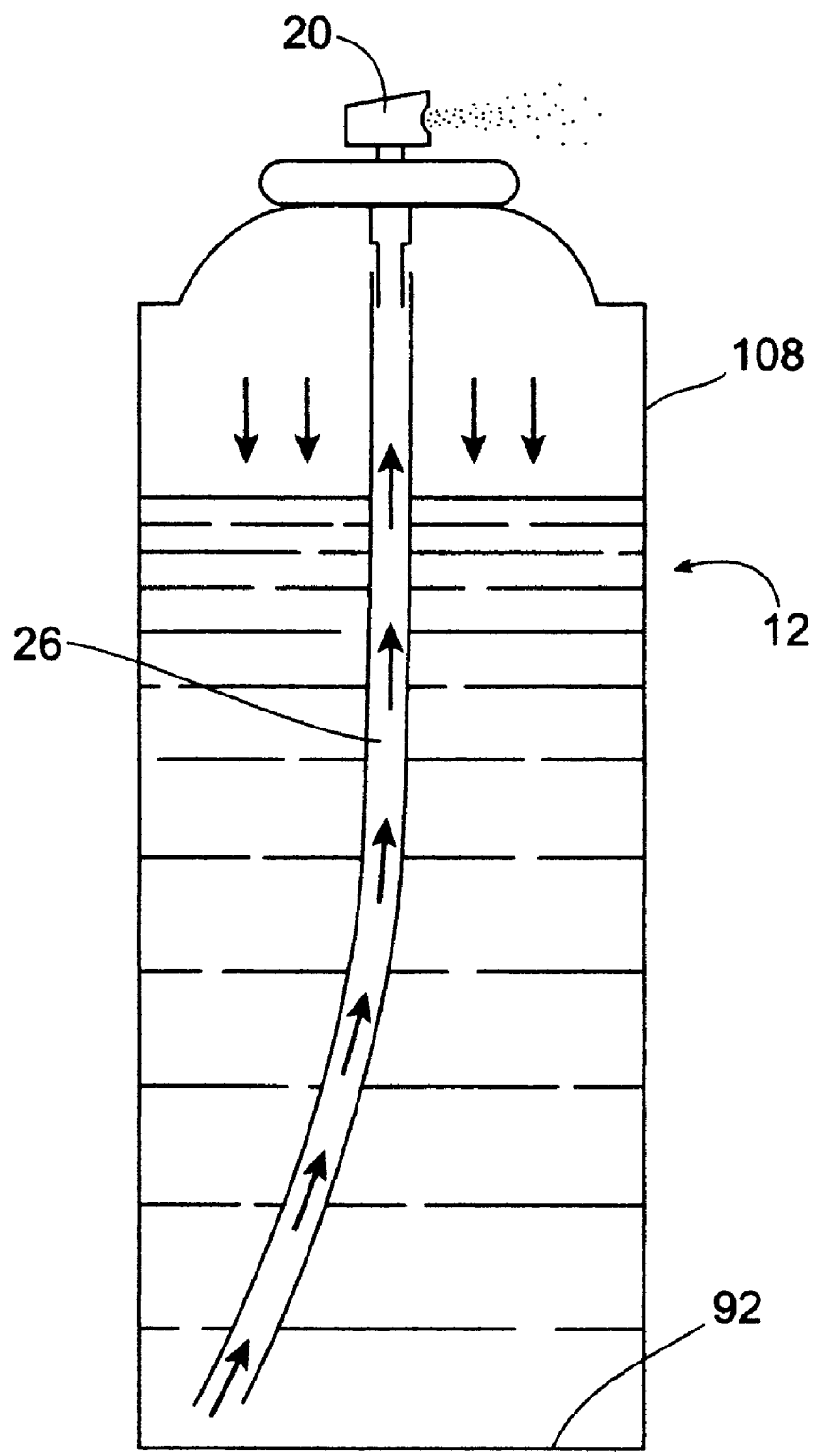
FIG. 3 is a cross-sectional view of an aerosol container used in the present invention.
Figures 4, 5:
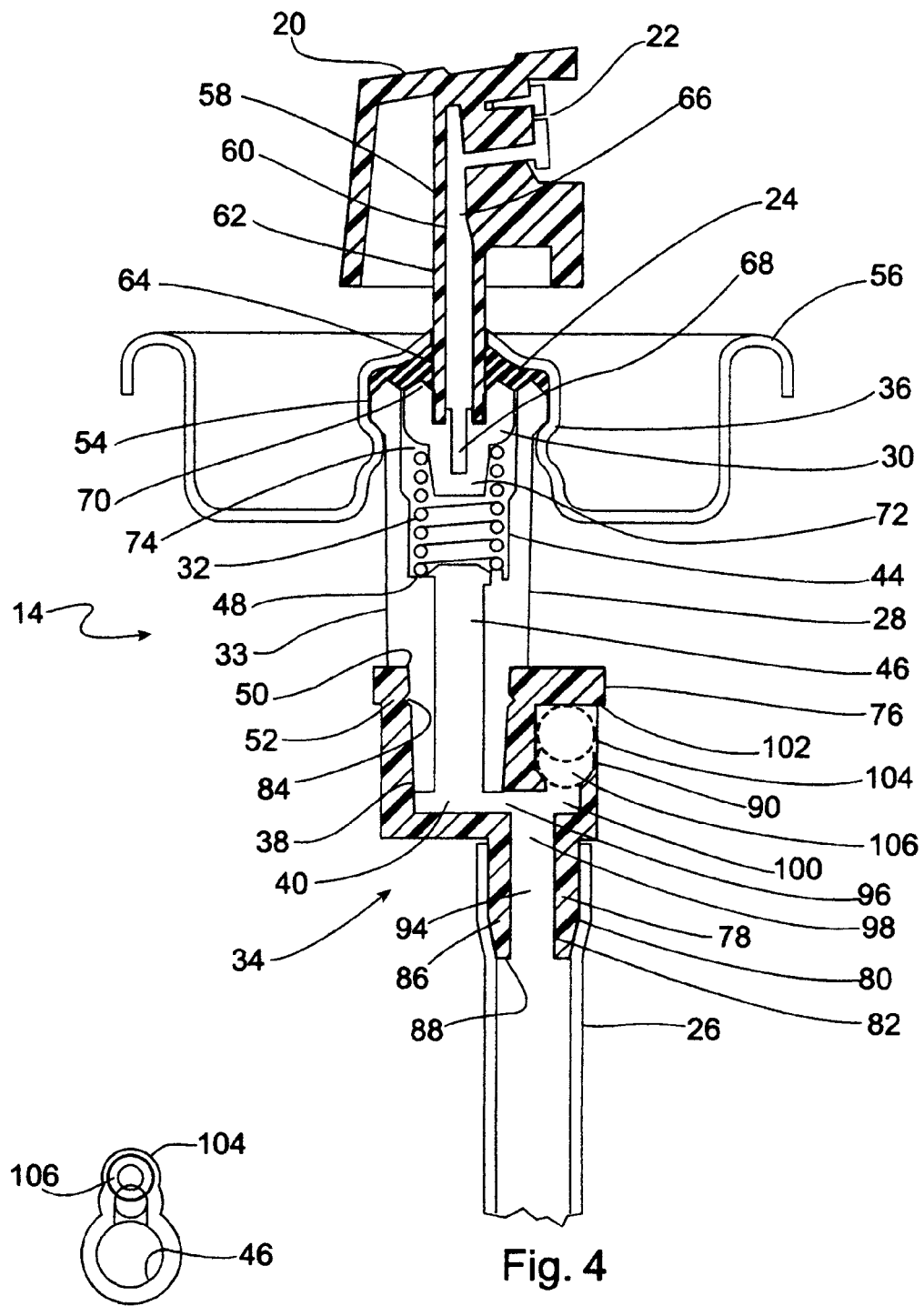
FIG. 4 is a side cross-sectional view of the omnidirectional valve of the present invention attached to a dip tube.
FIG. 5 is a cross-sectional plan view taken through the steel ball retainer of the omnidirectional valve of FIG. 4.

When solvent weld cement is used in the joining process, the resulting seal is watertight. According to the present invention, the solvent weld cement is applied as an aerosol from an aerosol container 12 (FIG. 3) having an omnidirectional female valve 14 (FIG. 4). The aerosol container 12 may be carried in a holster 16 which keeps the container 12 handy and avoids damage to, or loss of, the container 12. The holster 16 can conveniently be made of leather, Nylon, or similar durable material and is provided with a clip 18 which enables the holster 16 to be clipped onto a belt or the top of the pants of the installer. The installer can withdraw the container 12 from the holster 16, properly aim the container 12 so that spray will coat the desired portion of the pipe 2, depress the actuating valve 20 thus releasing aerosolized solvent weld cement from the container 12 through the omnidirectional valve 14, replace the container 12 into the holster 16, and properly connect the two ends 6, 10 of the plastic pipe 2.

Because the valve 14 is omnidirectional, the aerosol container 12 may be held at any angle and still produce a satisfactory spray pattern. The contents of the aerosol container 12 empty completely, thereby avoiding waste, and operate at temperatures below 20° F. By using an aerosol composition rather than a liquid composition applied by brush or rag, the set-up time is increased to about eight to twelve seconds, allowing the installer additional time to correctly align the pipe segments 4, 8.

The aerosol solvent weld cement composition of the present invention may be applied to a variety of plastic pipes in a wide array of applications. For instance, the compositions of the present invention can be applied in interior and exterior plumbing, in water supply pipes, communication pipes, drainage pipes, ventilation ducts, underground waste water systems, water supply systems, and irrigation systems.

The aerosol solvent weld cement composition of the present invention consists essentially of (a) at least one polymer adapted to weld plastic pipes to each other; (b) at least one organic solvent for the polymer; and (c) at least one propellant wherein the composition is under pressure greater than ambient atmospheric pressure. In the description of the composition of this invention, the term "consisting essentially of" is understood to have its well-recognized meaning in patent law. That is, it opens the definition of the composition only to the inclusion of unspecified ingredients which do not materially affect the basic and novel characteristics of the composition. Examples of ingredients which may be included as not materially affecting the basic and novel characteristics of the composition are suspending agents, dyes, and stabilizers.

The polymer of the composition may be any polymer or mixture of polymers appropriate for welding the plastic pipe segments to each other. The polymer may be at least one of chloropolyvinylchloride, polyvinylchloride, acrylonitrile-butadiene styrene polymers, polymers of lower alkyl esters of butyric acid, and polymers of lower alkyl esters of acrylic acid. The polymer component is preferably present in the range of about 10%–30% by weight of the total composition. Chloropolyvinylchloride polymers in the concentration of 10% by weight of the total composition constitute the most preferred embodiment.

When chloropolyvinylchloride is the polymer, a stabilizer in the solvent system is required in order to prevent the degradation of chloropolyvinylchloride. If the stabilizer is absent, the polymer may pre-polymerize such that it gels. Also, the polymer degrades to become more aggressive such that it may corrode the interior of the container, thereby contaminating the solvent weld cement composition. A stabilizer must be selected which can preclude the degradation of the chloropolyvinylchloride. Such stabilizers are known in the art. The stabilizer is preferably present in an amount up to 1% by weight of the solvent weld cement composition.

The solvent system of the composition may be any appropriate organic solvent which can solubilize the polymer being used. Examples of suitable solvents are tetrahydrofuran, acetone, diethoxyethane, N-methylpyrrolidone, dibasic esters, alkylene carbonates, dimethyl formamide, ethyl acetate, methyl isobutyl ketone, methyl alcohol, cyclohexanone, methyl ethyl ketone, gamma-butyrolactone, and mixtures thereof.

The solvent system is preferably present in an amount within the range of from about 50% to about 80% by weight of the aerosol solvent weld cement composition. For welding PVC pipe, it is preferred that the solvent system will be a mixture of about 30–50% by weight tetrahydrofuran, about 20–40% by weight acetone, about 10–20% by weight cyclohexanone, and about 5–15% by weight gamma-butyrolactone. More preferably, the solvent system is a mixture of about 40% by weight tetrahydrofuran, about 20% by weight acetone, about 15% by weight cyclohexanone, and about 10% by weight gamma-butyrolactone.

The propellant may be one of the conventional aerosol propellants. Examples of such propellants are dimethyl ether, isobutane, n-butane, propane, nitrogen, carbon dioxide, 1-difluoroethane, tetrafluoroethane, and mixtures of any two or more of these. When the pipe to be joined is made of PVC, it is preferred that the propellant be dimethyl ether. The propellant is preferably present in an amount of between about 20% by weight to about 35% by weight and most preferably, 30% by weight, of the aerosol solvent weld cement composition.

The aerosol solvent weld cement composition may also contain a suspending agent to improve the viscosity of the composition. The suspending agent may be any of those known in the art. Amorphous silica is preferred. The amount of the suspending agent is preferably 1–5% by weight of the solvent weld cement composition.

The aerosol solvent weld cement composition may additionally contain a dye for purposes of providing visibility to the composition when it is applied to a pipe. The dye should be oil soluble. Sufficient dye should be used to impart a color to the solvent weld cement composition when it is sprayed onto a pipe. Purple dyes are preferred. By incorporating a dye, a uniform distribution of the composition may be assured.

The aerosol solvent weld cement composition of this invention may be formulated and packaged using methods known in the art. The aerosol container 12 contains the aerosol solvent weld cement composition under pressure which is greater than ambient pressure and is sufficient to cause the solvent weld cement to issue as a spray when the actuating valve 20 is actuated. Preferably, the pressure within the container 12 is greater than 40 psi gage. More preferably, the pressure is 62 psi gage. The actuating valve 20 may have a standard or tapered orifice 22, although a wide open actuator 20 is preferred. The container 12 has an actuating valve 20 sealed to the container 12 by an elastomeric gasket 24. The container 12 may be lined or unlined. In order to provide omnidirectional characteristics to the aerosol container 12, a particular omnidirectional female aerosol valve 14 is used in combination with the composition of this invention.

The following example provides a preferred embodiment of the solvent weld cement composition according to this invention. All percentages are by weight of the total composition.

| | |
|---|---|
| CPVC polymer | 2–30% |
| dimethyl ether | 20–50% |
| Solvent system | 50–80% |
| tetrahydrofuran | 0–50% |
| acetone | 0–40% |
| cyclohexanone | 0–25% |
| butyrolactone | 0–20% |
| amorphous silica | 1–5% |
| oil-soluble dye | 0–1% |
| stabilizer | 0–1% |

The present invention encompasses the above-described aerosol solvent weld cement composition in a pressurized aerosol container 12 wherein a novel omnidirectional female valve 14 allows the container 12 to be positioned in any direction and permit a uniform spray pattern of the composition without clogging the valve 14.

The container 12 comprises an outlet 22, an unrestricted actuator 20, and a female omnidirectional valve 14 to permit a controlled release of the composition while the container 12 is in any position. The valve 14 is preferably sealed to the container 12 by an elastomeric gasket 24. The size of the container 12 is not critical, but should be conveniently handled by an installer. The container 12 may be tin plated, epoxy-lined steel, or epoxy-lined aluminum.

It has been determined that in the spraying of polymers from pressurized aerosol containers, the use of a male valve is inappropriate as male valves demonstrate a tendency to clog or plug, thereby rendering the aerosol container inoperative. The use of female valves for polymers has, until now, been limited to containers which are held upright. Such valves are less than ideal for the task of connecting plastic pipe as this task requires the aerosol container to be usable in the inverted position in tight quarters. Until now, an omnidirectional female valve has not been available to the art, and this has required physical gyrations by the user if anything other than surfaces easily sprayed by an upright container needed to be sprayed.

Part of the present invention is an omnidirectional female valve 14 for use as the valve in the pressurized container 12, which contains a dip tube 26, which container 12 will be inverted during use. This valve 14 may be more readily understood with reference to FIGS. 4 and 5. Reference is also made to FIG. 3 for features of the container 12 not shown in FIGS. 4 and 5.

The novel valve 14 comprises a valve body 28, a valve seal 24, an actuator 20, a valve plunger 30, a compression spring 32, and an omnidirectional attachment 34.

The valve body 28 is constructed of suitable thermoplastic resins or Nylon and is generally cup-shaped. The valve body 28 has a thickened top rim 36 surrounded by castellations. The valve body 28 further contains a lower end 38 having a central intake opening 40, an exterior surface 42, an interior cup-shaped opening 44, an internal passageway 46 extending from the lower end 38 to the cup-shaped opening 44, an internal shoulder 48, an external shoulder 50, and an exterior ridge 52.

The valve seal 24, preferably made of rubber, fits across the top rim 36 of the valve body 28 and is held between the valve body 28 and the interior surface 54 of a modified cup 56 by crimping around the castellations of the valve body 28. The valve seal 24 assures a permanent tight fit between the interior surface 54 of the cup 56 and the top rim 36 of the valve body 28. The cup 56 is of such a size as to fit the standard one-inch (2.54 cm) hole in aerosol containers 12.

The actuator 20 is located above the valve body 28 and mounts on the valve plunger 30. The actuator 20 contains an outlet orifice 22 and a vertical stem 58 having inner 60 and outer 62 surfaces, an inlet orifice (not shown) commonly in the form of a slit between the inner 60 and outer 62 surfaces of the stem 58, a lower end 64, and a passageway 66 for the viscous material.

The valve plunger 30 contains an open cup 68 having an upper surface 70 for holding the lower end 64 of the actuator 20, a closed bottom 72 which fits inside the compression spring 32, and a lower shoulder 74 for abutting with the compression spring 32. The valve plunger 30 is slidably held in the cup-shaped opening 70 of the valve body 28.

The compression spring 32 has an upper end which abuts with the lower shoulder 74 of the valve plunger 30 and a lower end which abuts with the internal shoulder 48 of the valve body 28. When there is no downward pressure on the actuator 20, the spring 32 tends to force the valve plunger 30 upwardly against the valve seal 24, thus preventing escape of the contents from the container 12. When there is a downward pressure on the actuator 20, the valve plunger 30 is forced downwardly and a space develops between the valve seal 24 and the upper surface 70 of the valve plunger cup 68, and the contents of the container 12 are allowed to escape through the inlet orifice (not shown) into the stem 58 of the actuator 20.

The omnidirectional attachment 34 contains a top 76 which abuts against the external shoulder 50 of the valve body 28, side walls 78 having exterior 80 and interior 82 surfaces, the side walls 78 having a notch 84 on the interior surface 82, a hollow lower stem 86 having a lower end 88, and a check valve container 90.

The lower stem 86 fits into a dip tube 26 which extends from the lower stem 86 to the bottom 92 of the container 12. The lower stem 86 contains a lower vertical passageway 94 and lateral passageway 96 through which the viscous material passes when the container 12 is in the upright position. The lateral passageway 96 leads from the upper end 98 of the lower passageway 94 in the lower stem 86 to the central intake opening 40 of the valve body 28.

The top 76 of the omnidirectional attachment 34 is held permanently in place to the valve body 28 by a snap-on connection between the external ridge 52 of the valve body 28 and the notch 84 on the interior surface 82 of the side wall 78 of the omnidirectional attachment 34.

The check valve container 90 contains an open, but constricted, lower end 100 joining the lateral passageway 96, a top surface 102, a lateral opening 104, and a check ball 106.

The operation of the omnidirectional valve 14 will now be described with reference to FIG. 4. In this description, the term "upright position" refers to any position of the container 12 which allows the check ball 106 to close the constricted lower end 100 of the check valve container 90, the term "inverted position" refers to any position which allows the check ball 106 of the check valve container 90 to open the constricted lower end 100 of the check valve container 90 and allow passage of viscous material through the lateral opening 104 into the lateral passageway 96, the term "upper end 108 of the container 12" refers to that end closest to the actuator 20, and the term "lower end 92 of the container 12" refers to that end farthest from the actuator 20.

When the container 12 is in the upright position or the inverted position, and the actuator 20 is not depressed, no solvent weld cement material will flow from the container 12 through the actuator 20.

When the container 12 is in the upright position, the solvent weld cement material inside the container 12 is at the lower end 92 of the container 12 and the pressurizing gas is in the upper end 108 of the container 12. If the actuator 20 is depressed, the solvent weld cement material is forced up the dip tube 26, into the lower passageway 66 in the stem 86 of the omnidirectional valve attachment 34, through the lateral passageway 94, through the internal passageway 46 of the valve body 28, around the valve plunger 30, through the inlet orifice (not shown) of the actuator 20, through the passageway 66 of the stem 58 of the actuator 20, and out the outlet orifice 22 of the actuator 20. In this case, neither the solvent weld cement material nor the propellant enters the check valve container 90 as the check ball 106 seals off the constricted lower end 100 thereof.

When the container 12 is in the inverted position, the solvent weld cement material inside the container 12 is at the upper end 108 of the container 12 and the pressurizing gas is in the lower end 92 of the container 12. In this position, the check ball 106 (shown dashed) lies against the top surface 102 of the check valve container 90 allowing flow of solvent weld cement material from the upper end 108 of the container 12 into the lateral passageway 96 of the omnidirectional attachment 34. If the actuator 20 is depressed, the solvent weld cement material is forced by the pressurizing gas through the lateral opening 104 into the check valve container 90, past the check ball 106, through the lateral passageway 96, through the internal passageway 46 of the valve body 28, around the valve plunger 30, through the inlet orifice (not shown) of the actuator 20, through the passageway 66 of the actuator 20, and out the outlet orifice 22 of the actuator 20. In this case, the pressurizing gas does not enter the internal passageway 46 of the valve body 28 as the solvent weld cement material seals off the lateral passageway 96.

The present invention also includes a method of dispensing an aerosol solvent weld cement from a pressurized aerosol container 12. The method comprises the steps of (a) obtaining a solvent weld cement composition as described above in an aerosol container 12 containing an omnidirectional valve 14 as described above at a pressure greater than ambient atmospheric pressure and (b) opening the omnidirectional valve 14 of the container 12 so as to cause the pressurized aerosol solvent weld cement composition to be released from the container 12.

Another aspect of the present invention is a method of welding two sections 4, 8 of plastic pipe 2 at a junction by using the above-described aerosol solvent weld cement composition. This method comprises (a) obtaining a solvent weld cement composition as described above in an aerosol container 12 containing an omnidirectional valve 14 as described above at a pressure greater than ambient atmospheric pressure, (b) opening the omnidirectional valve 14 of the container 12 so as to cause the pressurized aerosol solvent weld cement composition to be released from the container 12 onto at least one of the two sections 4, 8 of plastic pipe 2 at the prospective location of the junction; and (c) adjoining the two sections 4, 8 of plastic pipe 2 so as to form the junction by welding action.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An aerosol spray container containing an aerosol solvent weld cement composition under pressure greater than ambient pressure, said composition consisting essentially of (a) at least one polymer capable of welding ends of plastic pipes to each other, (b) at least one solvent for the polymer, and (c) at least one propellant for the polymer/solvent mixture.

2. The aerosol spray container of claim 1, wherein the polymer in the composition is at least one polymer selected from the group consisting of chloropolyvinylchloride, polyvinylchloride, acrylonitrile-butadiene-styrene polymers, polymers of lower alkyl esters of butyric acid, and polymers of lower alkyl esters of acrylic acid.

3. The aerosol spray container of claim 2, wherein the polymer in the composition is present in the range of about 10%–30% by weight of the total composition.

4. The aerosol spray container of claim 3, wherein the solvent in the composition is present in the amount of 50–80% by weight and is selected from the group consisting of tetrahydrofuran, acetone, diethoxyethane, N-methylpyrrolidone, dibasic esters, alkylene carbonates, dimethyl formamide ethyl acetate, methyl isobutyl ketone, methyl alcohol, cyclohexanone, methyl ethyl ketone, and gamma-butyrolactone.

5. The aerosol spray container of claim 4 wherein the solvent in the composition is present in the amount of 20–35% by weight and is at least one of the members of the group consisting of dimethyl ether, isobutane, n-butane, propane, nitrogen, carbon dioxide, 1-difluoroethane, and tetrafluoroethane.

6. The aerosol spray container of claim 5, wherein the solvent weld cement composition further comprises at least one member selected from the group consisting of a suspending agent, a dye, and a stabilizer.

7. The aerosol spray container of claim 3, wherein the polymer in the composition is chloropolyvinylchloride in the concentration of about 10% by weight of the total composition.

8. The aerosol spray container of claim 2, wherein the solvent in the composition is at least one member selected from the group consisting of tetrahydrofuran, acetone, diethoxyethane, N-methylpyrrolidone, dibasic esters, alkylene carbonates, dimethyl formamide, ethyl acetate, methyl isobutyl ketone, methyl alcohol, cyclohexanone, methyl ethyl ketone, and gamma-butyrolactone.

9. The aerosol spray container of claim 8, wherein the propellant in the composition is at least one of the members of the group consisting of dimethyl ether, isobutane, n-butane, propane, nitrogen, carbon dioxide, 1-difluoroethane, and tetrafluoroethane.

10. The aerosol spray container of claim 1, wherein the container contains an omnidirectional valve.

\* \* \* \* \*